US007912448B2

(12) United States Patent
Hinrikus et al.

(10) Patent No.: US 7,912,448 B2
(45) Date of Patent: Mar. 22, 2011

(54) WIRELESS DEVICE FOR VOICE COMMUNICATION

(75) Inventors: Taavet Hinrikus, Tallinn (EE); Gareth O'Loughlin, London (GB); Malthe Sigurdsson, London (GB); Priidu Zilmer, Tallinn (EE); Duncan Lamb, Tallinn (EE)

(73) Assignee: Skype Limited, Dublin (IE)

( * ) Notice: Subject to any disclaimer, the term of this patent is extended or adjusted under 35 U.S.C. 154(b) by 1189 days.

(21) Appl. No.: 11/515,411

(22) Filed: Aug. 31, 2006

(65) Prior Publication Data
US 2008/0076409 A1   Mar. 27, 2008

(51) Int. Cl.
*H04W 88/02* (2009.01)
(52) U.S. Cl. .................................... 455/404.2
(58) Field of Classification Search ........... 370/88.13, 370/260, 352, 356, 252, 338, 357, 428, 463, 370/493; 455/404.2, 445, 522, 552.1, 553.1, 455/566, 557; 379/45, 552.1, 553.1, 566, 379/557; 709/206, 224
See application file for complete search history.

(56) References Cited

U.S. PATENT DOCUMENTS

| | | | | |
|---|---|---|---|---|
| 2003/0072330 | A1* | 4/2003 | Yang et al. | 370/493 |
| 2004/0141484 | A1* | 7/2004 | Rogalski et al. | 370/338 |
| 2005/0122965 | A1* | 6/2005 | Heinla et al. | 370/357 |
| 2006/0079280 | A1* | 4/2006 | LaPerch | 455/557 |
| 2007/0121561 | A1* | 5/2007 | Yashar et al. | 370/338 |
| 2007/0198432 | A1* | 8/2007 | Pitroda et al. | 705/64 |
| 2008/0056208 | A1 | 3/2008 | Hinrikus et al. | |

FOREIGN PATENT DOCUMENTS
WO    WO 2005/009019    1/2005

OTHER PUBLICATIONS

Baset, S.A., et al., "An Analysis of Skype Peer to-Peer Internet Telephony Protocol," [on line], XP002336407, Retrieved from Internet Jul. 18, 2005: URL: http://www1.cs.columbia.edu/salman/publications/cucs-039-04.pd (2005).

Singh, K., et al., "Peer-to-Peer Internet Telephony Using SIP," [on line] XP002336408, Retrieved from Internet Jul. 18, 2005: URL: http://www1.cs.columbia.edu/library/TR-repository/reports/reports-2004/cucs-044-04.pdf> (2004).

"Planet Networking & Communication: 802.11g SIP DECT VoIP Router—data sheet," [on line], XP002461819, pp. 1-2, Retrieved from Internet: URL:http://www.planet.com.tw/product/pdf/c-VIP462DG-1.pdf (2005).

(Continued)

Primary Examiner — Diane Mizrahi
(74) Attorney, Agent, or Firm — Hamilton, Brook, Smith & Reynolds, P.C.

(57) ABSTRACT

A wireless handset for use in a peer-to-peer voice communications system comprising: a display; a keyboard comprising multifunctional keys capable of entering numeric or alphabetic characters depending on a number of key presses, said keyboard being arranged to enter contact information into a user interface displayed on said display, select contacts on the user interface, and initiate a packet data voice call with a contact; a microprocessor arranged to execute embedded client software, wherein the client software is arranged to establish a packet data voice call over the network and encode speech information as individually addressed packets; and a radio communication device arranged to transmit said individually addressed packets as radio signals from said wireless handset to a network.

17 Claims, 10 Drawing Sheets

OTHER PUBLICATIONS

ABCDATA: "Planet VIP-462DG-DECT fähiger VoIP Router," [on line], XP002461820, Retrieved from Internet URL:http://web.archive.org/web/20060212073112/http://www.abcdata.de/abcdataneu/VIP-4 62DG.php> (2006).

Minar, N., et al., "Peer-to-Peer-Harnessing the Benefits of a Disruptive Technology," O'Reilly, US, Sebastopol, XP002461821 ISBN: 0-596-00110-X, pp. 1-13 (2001).

International Search Report from International Application No. PCT/GB2007/003281; Date Mailed: Jan. 19, 2007.
Advisory Action, U.S. Appl. No. 11/515,402, dated May 6, 2010.
Office Action, U.S. Appl. No. 11/515,402, dated Dec. 31, 2009.
Office Action, U.S. Appl. No. 11/515,402, dated Jun. 23, 2009.
Notice of Allowance, U.S. Appl. No. 11/515,402, dated Jun. 25, 2010.
Notice of Allowance, U.S. Appl. No. 11/515,402, dated Aug. 25, 2010.

* cited by examiner

WIRELESS DEVICE FOR VOICE COMMUNICATION

FIELD OF THE INVENTION

This invention relates to a wireless device for voice communication, particularly for peer-to-peer communication.

BACKGROUND OF THE INVENTION

Peer-to-peer ("P2P") communication systems allow the user of a personal computer ("PC"), to engage in voice communication (calls) across a computer network such as the Internet. These systems are beneficial to the user as they are often of significantly lower cost than traditional telephony networks, such as fixed line or mobile cellular networks. This may particularly be the case for long distance calls. These systems utilise voice over internet protocol ("VoIP") over an existing network (e.g. the Internet) to provide these services, although alternative protocols can also be used. To use a peer-to-peer call service, the user must install and execute client software on their PC. The client software provides the VoIP connections as well as other functions such as registration and authentication. A call may be made using VoIP in accordance with methods known in the art, such as disclosed in WO 2005/009019.

Some calls in a peer-to-peer communication service may be free to the user, such as calls to other users of the same peer-to-peer service. There are therefore significant advantages to the user of the P2P communication service compared to traditional fixed or mobile services. However, the user is constrained by the fact that, in order to make or receive calls using a P2P communication service, they must have access to a PC. Even if the user does have access to a PC, the user must first switch on the PC before making a call, and consequently wait for it to boot up before the call can be made. Additionally, if the user wishes to receive incoming calls, they must leave the PC switched on, as otherwise calls cannot be received. This has the disadvantage of being inefficient from an energy consumption perspective.

Users may also be accustomed to mobility whilst using conventional telephony services, due to the prevalence of cordless phones and mobile cellular networks. With P2P communication services, however, the user's location is restricted to the area directly around the PC running the P2P client software.

SUMMARY OF THE INVENTION

According to one aspect of the present invention, there is provided a wireless handset for use in a peer-to-peer voice communications system comprising: a display; a keyboard comprising multifunctional keys capable of entering numeric or alphabetic characters depending on a number of key presses, said keyboard being arranged to enter contact information into a user interface displayed on said display, select contacts on the user interface, and initiate a packet data voice call with a contact; a microprocessor arranged to execute embedded client software, wherein the client software is arranged to establish a packet data voice call over the network and encode speech information as individually addressed packets; and a radio communication device arranged to transmit said individually addressed packets as radio signals from said wireless handset to a network.

In one embodiment, the individually addressed packets comprise voice over internet protocol (VoIP) packets.

Preferably, the wireless handset further comprises a storage device for storing contact information, whereby, upon activation of the wireless handset, the contact information is transmitted to the wireless handset from a contact server connected to said network and stored in said storage device.

In another embodiment, the user interface further displays presence information for the contacts, said presence information indicating the current status of the contact.

In another embodiment, the user interface further displays a contact search interface, whereby information is entered into the contact search interface using the keyboard and, in response thereto, the microprocessor is arranged to create a contact search request that is transmitted to the network by said radio communication device.

Preferably, in response to the contact search request, a contact search response is received by said radio communication device, said contact search response being displayed on said user interface. Preferably, a packet data voice call may be established with a contact displayed in said contact search response. Preferably, a contact displayed in said contact search response may be stored in the wireless handset.

According to another aspect of the present invention, there is provided a peer-to-peer voice communications system comprising: a wireless handset comprising: a display; a keyboard comprising multifunctional keys capable of entering numeric or alphabetic characters depending on a number of key presses, said keyboard being arranged to enter contact information into a user interface displayed on said display, select contacts on the user interface, and initiate a packet data voice call with a contact; a microprocessor arranged to execute embedded client software, wherein the client software is arranged to establish a packet data voice call over the network and encode speech information as individually addressed packets; and a radio communication device arranged to transmit said individually addressed packets as radio signals from said wireless handset to a network; and a network element connected to the network and arranged to communicate with said wireless handset, wherein the network element transfers the individually addressed packets between said wireless handset and the network.

In one embodiment, the individually addressed packets comprise voice over internet protocol (VoIP) packets.

Preferable, the peer-to-peer voice communications system further comprises a contact server connected to the network for storing the contact information for the wireless handset, wherein, upon activation of the wireless handset, the contact information is transmitted to the wireless handset via the network element and stored in said wireless handset.

In another embodiment, said packet data voice call is established with a user terminal connected to said network.

Preferably, the peer-to-peer voice communications system further comprises a gateway element connected between said data network and a public switched telephone network, wherein said packet data voice call is established with a user terminal connected to said public switched telephone network.

According to another aspect of the present invention, there is provided a peer-to-peer voice communications system comprising: a wireless handset for making a packet data voice call to a user terminal connected to a network, said user terminal being associated with contact information stored in said wireless handset; a network element connected to the network and arranged to communicate with said wireless handset, wherein the network element transfers packet data between said wireless handset and the network; and a contact server connected to the network for storing the contact information for the wireless handset, wherein, upon activation of the wireless handset, the contact information is transmitted to the wireless handset via the network element and stored in said wireless handset.

Preferably, the peer-to-peer voice communications system further comprises a gateway element connected between said data network and a public switched telephone network, wherein said user terminal is connected to the network via said public switched telephone network and said gateway.

In one embodiment, the packet data voice call is a voice over internet protocol (VoIP) call.

According to another aspect of the present invention, there is provided a handset for use in a peer-to-peer voice communications system comprising: a display; a keyboard comprising multifunctional keys capable of entering numeric or alphabetic characters depending on a number of key presses, said keyboard being arranged to enter contact information into a user interface displayed on said display, select contacts on the user interface, and initiate a packet data voice call with a contact; a microprocessor arranged to execute embedded client software, wherein the client software is arranged to establish a packet data voice call over the network and encode speech information as individually addressed packets; and a communication interface arranged to transmit said individually addressed packets from said handset to a network.

Preferably, the communication interface is a wired interface. Preferably, the communication interface is an Ethernet interface.

BRIEF DESCRIPTION OF THE DRAWINGS

For a better understanding of the present invention and to show how the same may be put into effect, reference will now be made, by way of example, to the following drawings in which.

DETAILED DESCRIPTION

Figure 1:
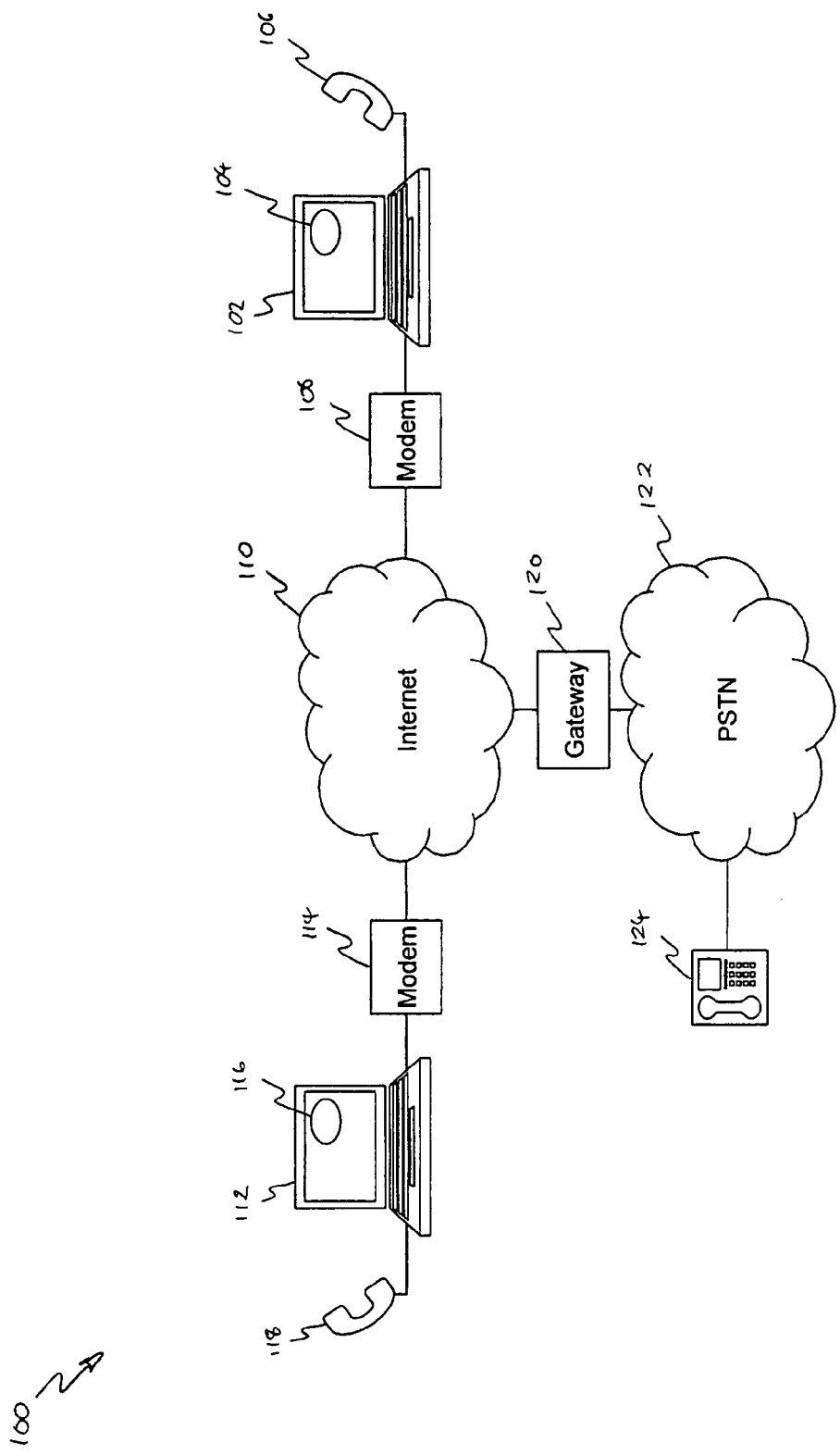
FIG. 1 shows a P2P communication system comprising a PC and a wired network connection.

Reference is first made to FIG. 1, which illustrates a known P2P communication system 100. A user of the P2P communication service operates a computer terminal 102, such as a PC, upon which is executed client software 104. Also connected to the PC is a handset 106, which comprises a speaker and microphone, to enable the user to listen and speak in a voice call in the same manner as with traditional fixed-line telephony. The handset 106 does not necessarily have to be in the form of a traditional telephone handset, but can be in the form of a headphone or earphone with an integrated microphone, or as a separate loudspeaker and microphone independently connected to the PC 102.

As mentioned, the computer terminal 102 is running a client 104, which is provided by the operator of the P2P communication service. The client 104 is a software program executed on a local processor in the computer terminal 102. To initiate a call, the user can click on a contact listed for another user displayed in the client 104, or can alternatively type in a username for the other user. The client 104 then sets up the call to the other user and the call can be made using VoIP. The client performs the encoding and decoding of VoIP packets.

The computer terminal 102 is connected to a modem 108, which allows the computer terminal to send and receive data from a network such as the Internet 110. In the example shown in FIG. 1, the computer terminal is connected to the modem 108 using a wired connection. The wired connection can be, for example, Ethernet or USB.

VoIP packets from the computer terminal 102 are transmitted into the Internet 110 via the modem 108, and routed to the computer terminal 112 of the other user via a modem 114. A client 116 (similar to the client 104) running on the computer terminal 112 of the other user decodes the VoIP packets to produce an audio signal that can be heard by the other user using the handset 118. Conversely, when the other user talks into handset 118, the client 116 executed on computer terminal 112 encodes the audio signals into VoIP packets and transmits them, via the modem 114, across the Internet 110 to the computer terminal 102. The client 104 executed on computer terminal 102 decodes the VoIP packets from the other user, and produces an audio signal that can be heard by the user of the handset 106.

Alternatively, the user of the computer terminal 102 can make a voice call to a user of a fixed-line telephone service. In this case, the user types in a telephone number of another user connected to the public switched telephone network ("PSTN") into the client 104. The client encodes the audio signals from the user as VoIP packets and these are transmitted into the Internet 110 via the modem 108. The VoIP packets are individually addressed IP packets. The VoIP packets are routed to a gateway 120 connected between the Internet 110 and the PSTN 122, where they are converted into a form suitable for transmission across the PSTN 122. The PSTN 122 delivers the converted voice information from the gateway 120 to the fixed-line telephone equipment 124 of the other user. Note that the user could also make calls to a mobile telephone via a mobile network, instead of the PSTN (not illustrated in FIG. 1).

The above-described system suffers from the previously mentioned problems that, in order for the user to make or receive phone calls using the P2P communication service, the computer terminal 102 must be present and activated. If the computer terminal 102 is not activated, the user must first switch it on before making a call. Additionally, if there is an incoming call, for example from the fixed-line telephone 124 or the computer terminal 112, then the computer terminal 102 must be powered on in order to receive the call.

Furthermore, the users are also constrained in their mobility whilst using the P2P communication service, due to the wired nature of the connections between the computer terminal 102 and the modem 108, and between the computer terminal 102 and the handset 106.

Figure 2:
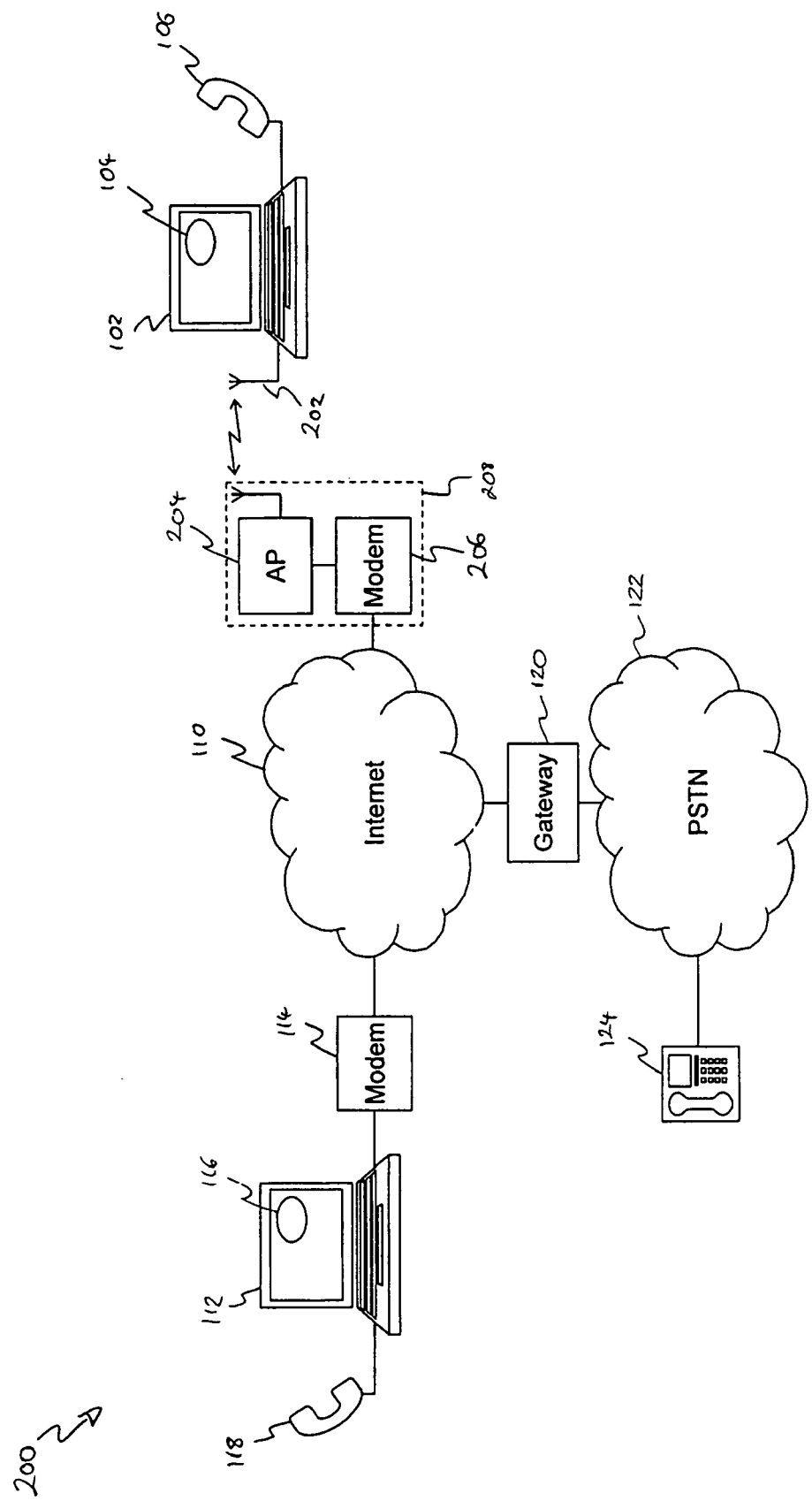
FIG. 2 shows a P2P communication system comprising a PC and a wireless network connection.

FIG. 2 shows an alternative known P2P communication system 200. The system 200 is identical to the system 100 shown in FIG. 1, except that the computer terminal 102 is connected to the Internet 110 via a wireless connection. The computer terminal 102 has a wireless local area network ("WLAN") module with an antenna 202, which is able to transmit data wirelessly to a WLAN access point ("AP") 204. The AP 204 is connected a modem 206, which is in turn connected to the Internet 110. The wireless connection can use a WLAN standard such as the IEEE 802.11 family of standards (also known as WiFi). The AP 204 and the modem 206 can be integrated into a single device (which may be referred to as a wireless modem or wireless router), as indicated by the dashed box 208. Alternatively, they can be separate devices.

The operation of the system 200 shown in FIG. 2 is the same as that shown in FIG. 1 and described above, except that the VoIP packets from the computer terminal 102 are sent to the modem 206 wirelessly, and, similarly, VoIP packets from other users are received at the computer terminal 102 wirelessly. This provides the user with a limited degree of mobility, particularly if the computer terminal is a laptop or notebook computer. However, the levels of mobility are still much lower than can be achieved with traditional cordless phones or mobile cellular phones. This is because a laptop or notebook computer is still of a significant size and weight, and hence has a much lower degree of portability than the user is accustomed to with mobile and cordless telephones.

Figure 3A:
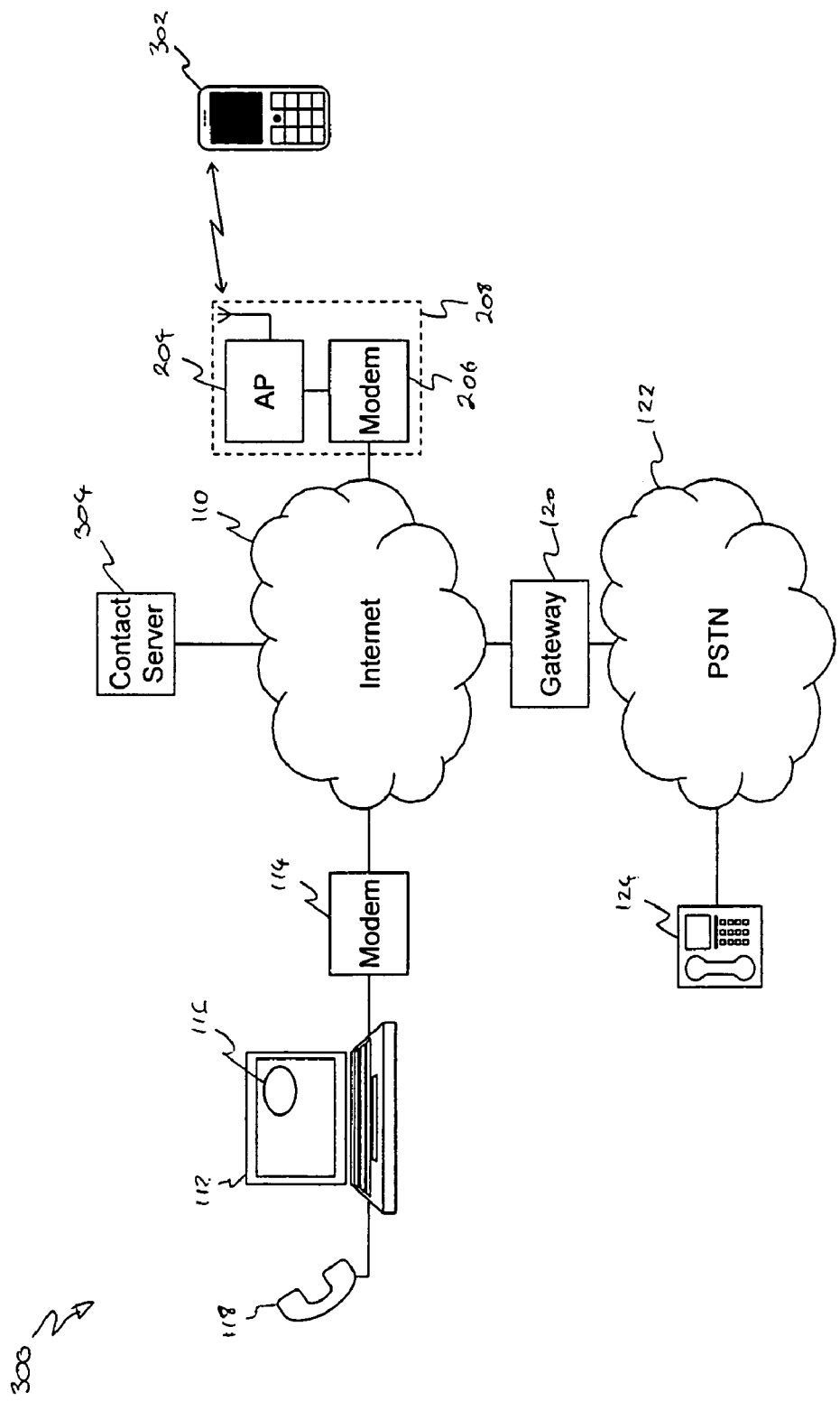
FIG. 3A shows a P2P communication system comprising a stand-alone wireless handset.

Reference is now made to FIG. 3A, in which is illustrated a P2P communication system 300 comprising a stand-alone wireless handset according to an embodiment of the present invention. FIG. 3A shows a dedicated wireless VoIP handset 302 for making VoIP calls across the Internet without the need for a computer terminal. As the wireless VoIP handset 302 is small enough to be hand-held, and a PC is not required, much greater levels of mobility can be achieved compared to a wireless laptop or notebook computer.

The wireless VoIP handset 302 connects to a wireless access point 204 of the same type as described above with reference to FIG. 2. In a preferred embodiment, the wireless VoIP handset 302 connects to the AP 204 using an IEEE 802.11 WiFi standard. In alternative embodiments, the wireless VoIP handset 302 connects to the AP 204 using a different wireless standard such as Bluetooth, IEEE 802.16 (WiMAX), ultra-wideband (UWB) or any other suitable wireless communications protocol.

The wireless VoIP handset 302 executes dedicated embedded client software to perform the same function as the client software 104 that was running on the computer terminal 102 in FIGS. 1 and 2. In particular, the client encodes audio signals from the user as individually addressed VoIP packets and transmits these packets wirelessly to the Internet. Therefore, by running embedded client software on a wireless VoIP handset 302 VoIP calls can be made without the computer terminal 102 being present. Embedded software means that the software is permanently loaded onto the device and cannot be removed by the user. However, it is still possible for the embedded software to be upgraded or updated by the user. In addition, only approved versions of the same software can be upgraded or updated, and the user cannot load any other type of software onto the device. Note that, in some embodiments, the embedded software can be upgraded "silently" without the user knowing it is happening.

Figure 3B:
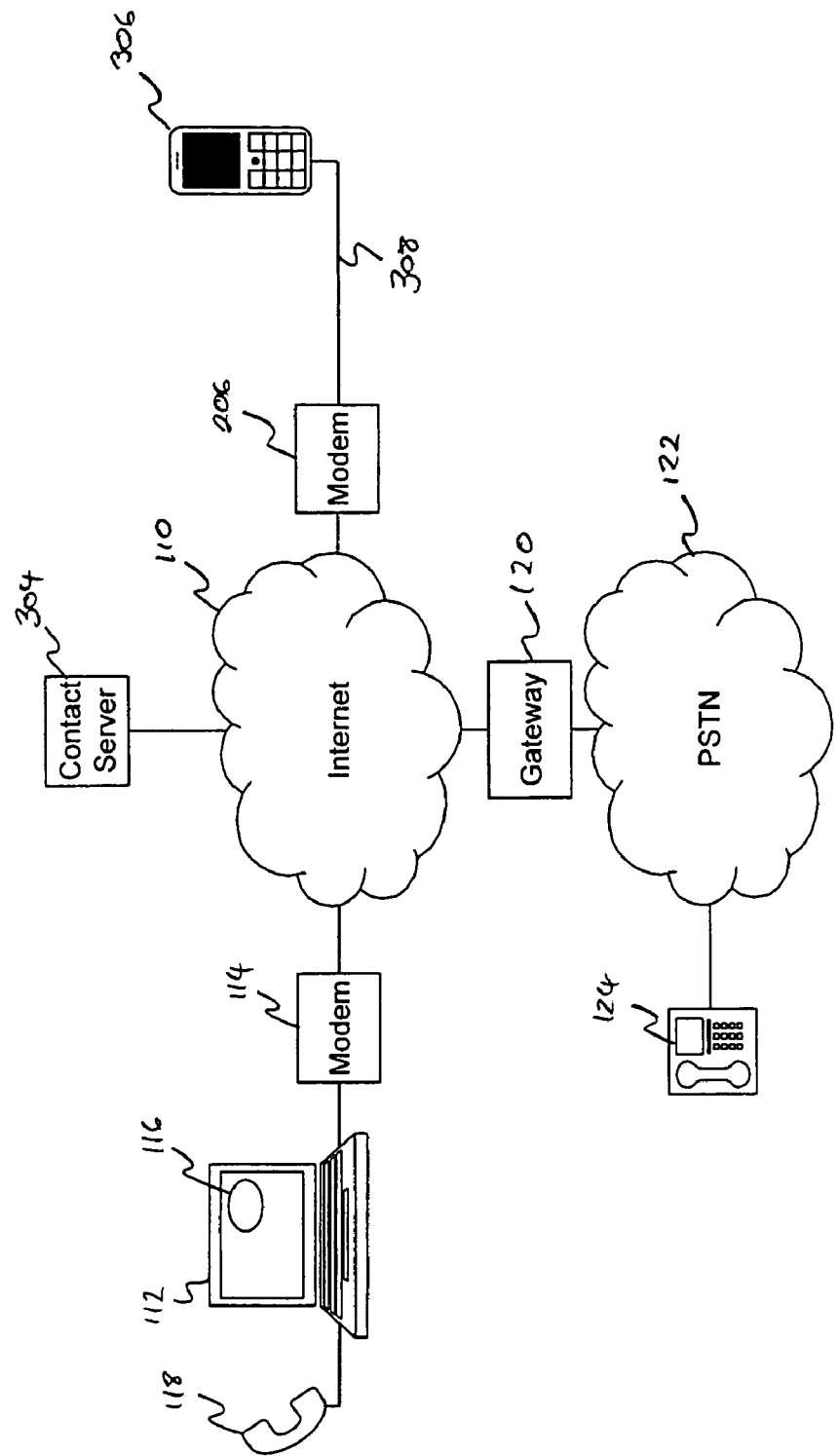
FIG. 3B shows a P2P communication system comprising a stand-alone wired handset.

FIG. 3B shows an alternative embodiment in which is illustrated a P2P communication system comprising a stand-alone wired handset. FIG. 3B shows a dedicated VoIP handset 306 for making VoIP calls across the Internet without the need for a computer terminal. The embodiment shown in FIG. 3B is similar to that described above with reference to FIG. 3A, except that the communication between the VoIP handset 306 and the modem 206 uses a wired link 308, rather than a wireless connection. In preferred embodiments, the link 308 between the VoIP handset 306 and the modem 206 is an Ethernet connection, although in alternative embodiments any suitable wired communication protocol could be used, such as USB.

Figure 4:
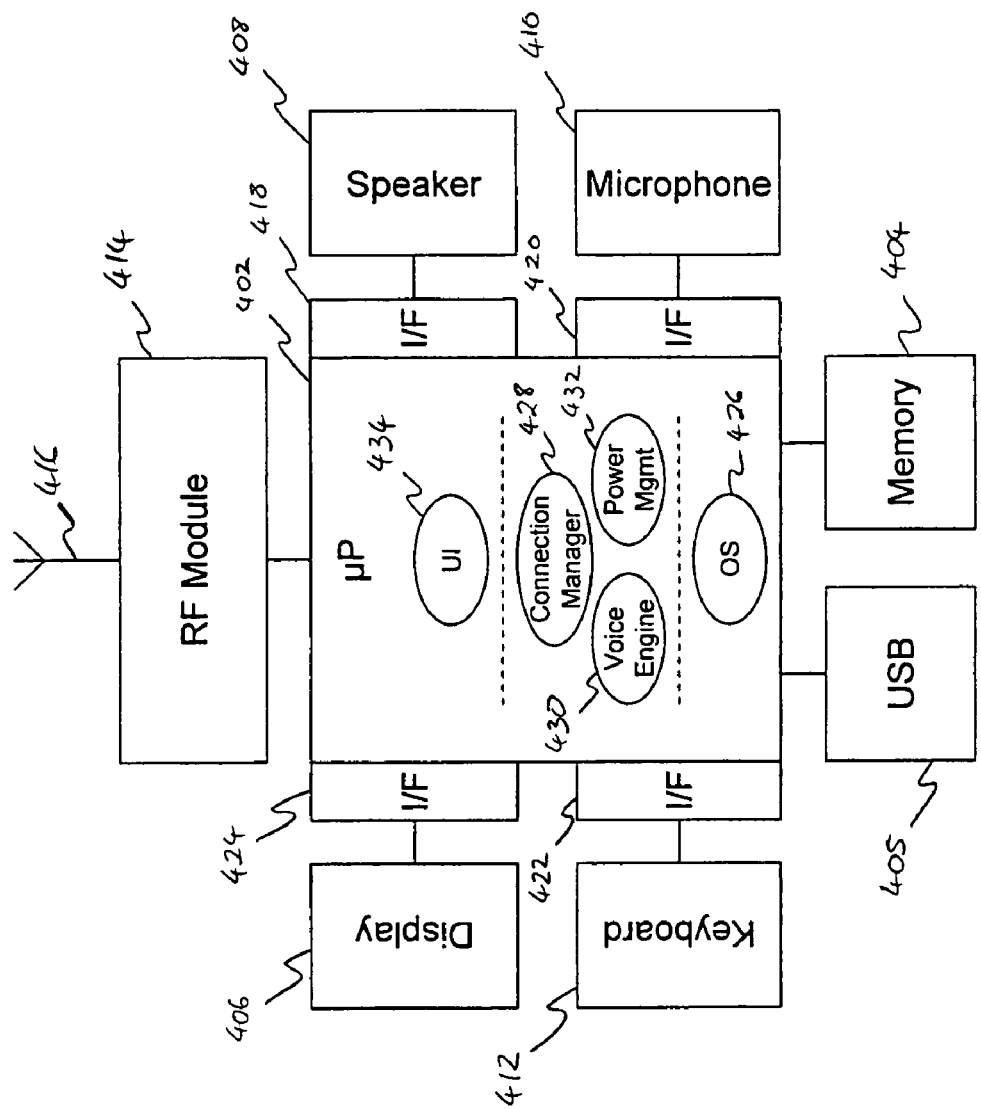
FIG. 4 shows the functional elements of a wireless VoIP handset.

Reference is now made to FIG. 4, which illustrates the main functional elements of the wireless VoIP handset 302. The wireless VoIP handset 302 comprises a microprocessor ("µP") 402 (also known a central processing unit ("CPU")), which controls the operation of the wireless VoIP handset 302 and executes embedded software. Connected to the microprocessor is a memory 404, an optional serial interface 405, a display 406 (such as a liquid crystal display ("LCD")), a speaker 408, a microphone 410 and a keyboard 412. A radio frequency ("RF") module 414 is also connected to the microprocessor, which implements the particular radio communication standard used by the handset 302, such as WiFi. The RF signals are transmitted and received from an antenna 416.

The speaker 408 may be connected to the microprocessor 402 via an interface 418 which comprises audio driver hardware (including for example amplifiers) and a digital to analogue converter. The functionality of the interface 418 may alternatively be integrated into microprocessor. The microphone 410 is connected to the microprocessor 402 via an interface 420 comprising audio receiving hardware (such as amplifiers) and an analogue to digital converter. Again, this functionality may be integrated into the microprocessor 402. The keyboard 412 is connected to the microprocessor 402 via an encoder interface 422. The display is connected to the microprocessor via a display driver interface 424. The memory 404 can include both Flash and RAM. The serial interface 405 is used for loading and updating software on the microprocessor 402. In preferred embodiments, the serial interface 405 is a universal serial bus ("USB") interface. In alternative embodiments other serial interfaces could also be used, such as the IEEE 1394 (Firewire) standard. In preferred embodiments, the serial interface 405 can also be used as a power source to charge the battery in the wireless VoIP handset 302. In alternative embodiments, a separate power supply can be used to charge the battery via a charging connector.

As the microprocessor 402 is operating within a battery powered handheld device, it needs to be of a lower processing power than the CPU inside a PC. For example, the microprocessor 402 for a handheld device can typically have a clock speed of 200-400 MHz. In alternative embodiments, the microprocessor 402 can be complemented by a digital signal processor ("DSP"), which can perform some of the voice processing functions (described below). This allows the microprocessor 402 clock speed to be reduced, for example to 50-200 MHz.

The microprocessor 402 executes embedded software to allow the wireless VoIP handset 302 to operate as a stand-alone VoIP device. The microprocessor 402 executes an operating system ("OS") 426. In preferred embodiments, the OS 426 is Linux, although other operating systems could also be used. The OS 426 allows programs to be run on the microprocessor 402 and controls low-level operations such as an IP stack and file system support.

Running on the OS 426 of the microprocessor 402 is a connection manager 428. The connection manager 428 is the central component of the client software, and handles connections to the P2P communication network. This includes the placing of calls, managing online status, and any communication with other users.

Operating under the control of the connection manager 428 is a voice engine 430 and a power management module 432. The voice engine 430 incorporates the codec for encoding and decoding the voice information. In preferred embodiments, the codec is a G.729 codec. This is used as it can be run easily on a handheld device with a lower processing power than a PC. However, in alternative embodiments, any other suitable codec such as G.711, G.726 and wideband AMR-WB could also be used.

Apart from performing the encoding and decoding of voice information, the voice engine 430 also provides a jitter buffer, echo cancellation facilities, voice activity detection and comfort noise generation. The voice engine further implements the sending and receiving of real-time protocol ("RTP") packet streams, the generation of dual tone multi-frequency ("DTMF") tones, and the setting of output amplification (i.e. volume).

The power management module 432 allows the connection manager 428 to control the power of the wireless VoIP handset 302. This is particularly important for battery powered handheld devices, as a long battery life is necessary for the device to be user-friendly. The connection manager can request a particular power level to be used by the handset. For example, the power requirement can be set to "none" if the connection manager 428 does not have any power requirements, thereby allowing the CPU to be turned off. The power requirement can be set to "background" if the connection manager 428 is performing background tasks that require a minimal level of CPU power. The power requirement can be set to "optimal" if the connection manager 428 is performing general tasks, and requires optimal processing power from the CPU. Finally, the power requirement can be set to "full" if the connection manager requires the maximum processing power from the CPU. Therefore, using these settings the connection manager 428 can control the power consumption of the handset in order to maximise battery life.

The user of the wireless VoIP handset 302 interacts and controls the connection manager 428 through a user interface ("UI") 434. The UI is specially adapted for display on the small screen of a handheld device, and is designed to be operated by a small keyboard (the structure of which will be described hereinafter). Through the UI 434 of the wireless VoIP handset 302, the user can use the P2P communication service with almost the same level of functionality as if they were using a PC 102 and a handset 106, as will now be described.

A new user of the P2P communication service can use the wireless VoIP handset 302 to create an account and login to the P2P communication system. This involves the user entering information such as their name using the keyboard of the wireless VoIP handset, and selecting a username and password.

When a user has logged into the P2P communication service they can access their contact list on the UI of the wireless VoIP handset. The contact list is created by the user and is a list of people that the user can readily set up a call with. The contact list may comprise usernames of users of the P2P communication service and regular PSTN phone numbers. In the case of contacts of other users of the P2P communication service, these contacts have authorised the user to view their "presence" information in the contact list. The presence information is an indication of the online status of a particular user. For example, the user is able to see if a contact is online, offline, busy or away (other presence states are also possible). This information is shown next to the contact's name in the contact list.

The user can set up a call to a contact in the contact list by, for example, simply selecting the appropriate contact using the keyboard (note that a call to a contact can be initiated using other methods, such as from a call history or typing a username). Referring again to FIG. 3A, if a call is made to another user of the P2P communication service, the connection manager 428 sets up the call by transmitting data from the RF module 414, via AP 204 and modem 206, across the Internet 110 to the destination computer terminal 112 running client 116 (via modem 114). The voice call can then proceed between the user of the wireless VoIP handset 302 and the user of handset 118 in a similar manner to that described with reference to FIG. 2.

Similarly, an incoming call from another user of the P2P communication service may be received at the wireless VoIP handset. In this case the call is set up by the client 116 of the computer terminal 112. The call is received at the wireless VoIP handset 302, and can be indicated to the user by a ring-tone, the vibration of the device, or a combination of these (depending on user preferences). The user is also displayed the identity of the caller on the UI, along with a picture, if this is available. The wireless VoIP handset has the advantage that the call can be received without a PC needing to be present or activated.

The user of the wireless VoIP handset can set up a call to a PSTN telephone user. This can be done by selecting a PSTN number in the contact list (this can be associated with a contact that only has PSTN numbers, or a contact that has both PSTN numbers and a P2P communication service username). Alternatively, the user can type the PSTN number into the keyboard manually (e.g. if the number is not associated with any contact). Referring again to FIG. 3A, the connection manager 428 makes the call by transmitting data from the RF module 414, via AP 204 and modem 206, across the Internet 110 to the gateway 120, where the data is are converted into a form suitable for transmission across the PSTN 122. The PSTN 122 delivers the converted data from the gateway 120 to the fixed-line telephone equipment 124 of the other user. Note that the user can also make calls to a mobile telephone via a mobile network (not illustrated in FIG. 3A), instead of the PSTN, in a similar manner.

The user of the wireless VoIP handset can also receive incoming calls from the PSTN. In common with incoming calls from the P2P communication system, the call is received at the wireless VoIP handset 302 and is indicated to the user by a ring-tone, the vibration of the device, or a combination of these (depending on user preferences). If CallerID information is available, then this is displayed on the UI. Again, the wireless VoIP handset has the advantage that the call can be received without a PC needing to be present or activated.

As the P2P communication service operates on peer-to-peer principles, the number of central servers is kept to a minimum. In fact, the P2P communication service can function almost fully without using central servers. However, the functionality of the service can be improved through the use of some central servers. For example, a central contact server (304 in FIG. 3A) can be used to allow synchronisation of the contact list for a user. When an existing P2P communication service user logs in on a new device (such as the wireless VoIP handset 302), the contact list for this user is retrieved from the central contact server 304. Once it has been retrieved from the contact server 304, the contact list is cached in the memory 404 of the wireless VoIP handset 302. Therefore, the contact list does not need to be retrieved every time the user logs in using the wireless VoIP handset. Note that, in reality, more than one contact server 304 would be present, for redundancy and scalability reasons. However, only a single server is shown in FIG. 3A for clarity.

In preferred embodiments, not all information for every contact needs to be stored on the contact server 304. Only usernames, the display name and the authorisation status are required to be stored on the contact server 304. Other information such as the picture associated with a contact (known as the "avatar") is obtained from the P2P communication network. In alternative embodiments, all information could be centrally stored on the contact server.

The use of a central contact server 304 allows the user to log into the P2P communication service from a variety of devices and maintain a single unified contact list. For example, the user may use both a PC and a wireless VoIP handset at their home, and can get the same contact list on either of these devices. Furthermore, the user can also go to the home or workplace of a different user of the P2P communication service, and use the wireless VoIP handset of the different user to log into the network. The user will then have access to their own contact list, even though they are not the owner of the device accessing the network. The access to your own contact list on any device is a significant advantage over traditional PSTN and mobile telephones.

The user of the wireless VoIP handset 302 can use the UI and the keyboard of the device to search for the contact details of other users of the P2P communication service. The user is presented with a dialog box, in which they can enter details about a user they wish to search for (e.g. their full name or username). The wireless VoIP handset 302 then retrieves this information from the network, and presents the results to the user in the UI. In effect, this allows the wireless VoIP handset to have access to a directory of all the users of the P2P communication service directly from the device. This type of functionality is not available on PSTN and mobile telephones, and provides a substantial advantage to the user.

Once contacts have been found using the above-described search functionality, they can be added to the contact list directly from the wireless VoIP handset. Similarly, PSTN numbers can also be added to the contact list directly from the wireless VoIP handset. The user is also able to view profile information for users of the P2P communication service that have been found using the search or are in the user's contact list. The profile information contains details about the contact, including the contact's picture, which can be viewed on the wireless VoIP handset 302.

Other functionality implemented on the wireless VoIP handset 302 includes: call forwarding to another number; call waiting (such that an ongoing call can be placed on hold so that the user can answer another incoming call, and the user can flip back and forth between these calls); support for DTMF tones; access to voicemail (including leaving and retrieving messages, setting a custom greeting, and reverting back to a standard greeting); a call history distinguishing between missed, incoming and outgoing calls; participation in conference calls; access to account information; and the sending and approving of authorisation requests for contacts.

The UI of the wireless VoIP handset also provides notification of various events to the user. This includes network events such as incoming calls (through notification on the UI as well as ring-tones and vibration, as mentioned previously), notification of missed calls, and notification of voicemail messages. In addition, environmental events are handled and notified to the user, such as low battery alerts and wireless network signal strength.

The user of the wireless VoIP handset can configure the device to operate with different WiFi networks. The wireless VoIP handset can support a range of commonly used encryption formats and a list of preferred networks is stored on the device. This allows the wireless VoIP handset to operate with both secured and unsecured wireless networks, and to quickly locate and connect to particular preferred networks (such as at the home of the user).

As illustrated in FIG. 4, the wireless VoIP handset comprises a USB serial interface 405. This interface can be used to upgrade the software on the wireless VoIP handset. All the software on the wireless VoIP handset including the kernel and drivers can be updated over USB using a PC and a specific application executed on the PC. Furthermore, certain aspects of the software may be updated wirelessly over the Internet directly to the device, without the need to connect to a PC.

Figure 5:
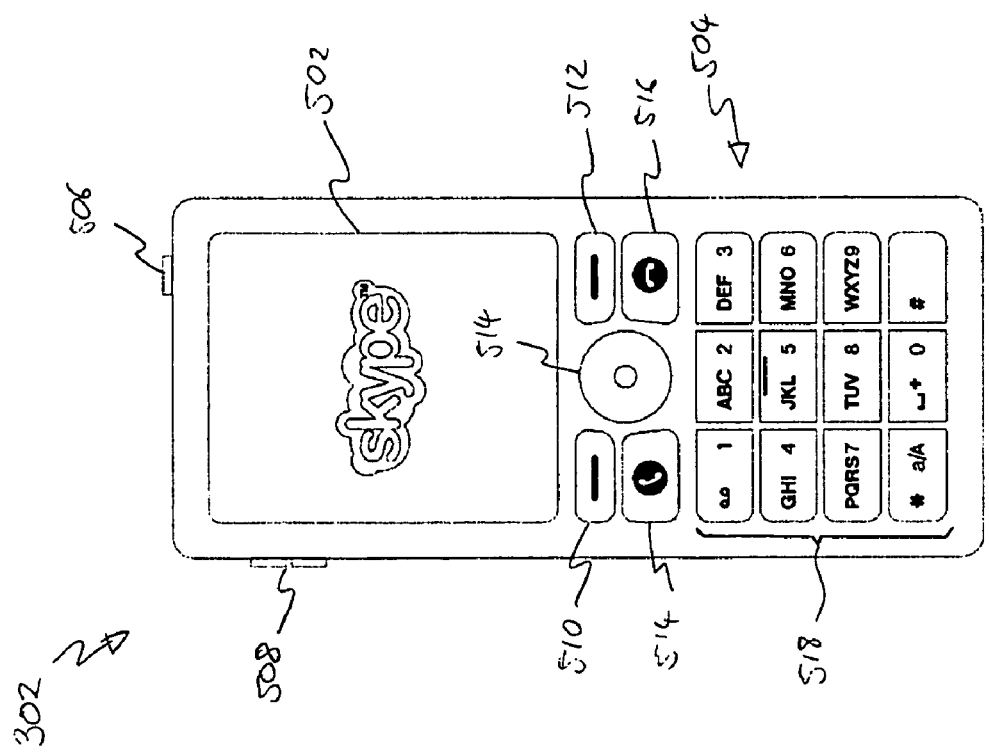
FIG. 5 shows the external controls of a wireless VoIP handset.

Reference is now made to FIG. 5, in which is shown an example of the external controls of the wireless VoIP handset 302. The front of the wireless VoIP handset 302 comprises a display 502 (such as an LCD) on which is displayed the UI. Below the display is a keyboard 504. In preferred embodiments, at the top of the device is a power button 506 and at the side of the device are volume up and volume down keys 508.

The keyboard 504 comprises a left soft key ("LSK") 510 which is used to invoke various specific actions that are shown in the UI on the display 502 directly above the LSK 510. In particular, the LSK 510 is used for "positive" actions such as "Options" and "Select". A right soft key ("RSK") 512 is also present that invokes actions shown in the UI on the display 502 directly above the RSK 510. In particular, the RSK 512 is used for "negative" actions such as "Back" and "Clear".

Between the two soft keys is located a navigation pad 514. The navigation pad can be moved up, down, left and right by the user to navigate through the menu system and move a cursor for text entry. The centre of the navigation pad 514 can be depressed by the user to invoke a selection. A send key 514 is present which is used to initiate a call. This key is typically coloured green. An end key 516 is present that, during an active call, ends the call, and, during an incoming call, rejects the call. This key is typically coloured red. The end key 516 is also used to clear the content of a dialog box, and closes the dialog and returns the user to a main idle screen of the UI with subsequent presses. Elsewhere in the UI a single press of the end key 516 returns the user to the idle screen. If device does not include a power key, the power menu can be presented on the end key 516. For example, a press of the end key 516 for <1.5 seconds would perform the end key actions described above, a press of 1.5 to 4 seconds displays a power menu, and a press of >4 seconds switches off the device.

An alphanumeric keypad 518 is located at the bottom of the front face of the wireless VoIP handset. This is of a similar configuration to that found on a traditional mobile telephone. However, in preferred embodiments, the labelling of the keypad is adapted to the function of the wireless VoIP handset. In particular, because the P2P communication system operates largely on names, rather than numbers, the alphanumeric keys are labelled with the letters more prominent than the numbers, whereas with traditional telephones the opposite is true.

The alphanumeric keypad 518 is used for text entry, such as adding or searching contacts. It is also used for number entry, such as adding and dialling PSTN numbers. In particular, the keys of the keyboard are multifunctional, such that a single key represents a number of different characters. Different characters associated with a particular key may be accessed depending on the number of key presses of the key. Some of the keys may also be used for other features depending on the UI context in which they are used. For example, the "1" key can be used to access voicemail with a long press, the "0" key can be used to enter a space, the "*" key can be used to change text entry modes, and the "#" key can be used to enter language symbols.

Reference is now made to FIGS. 6 to 9, in which are illustrated examples of the user interface as different common operations are performed using the wireless VoIP handset.

Figure 6:
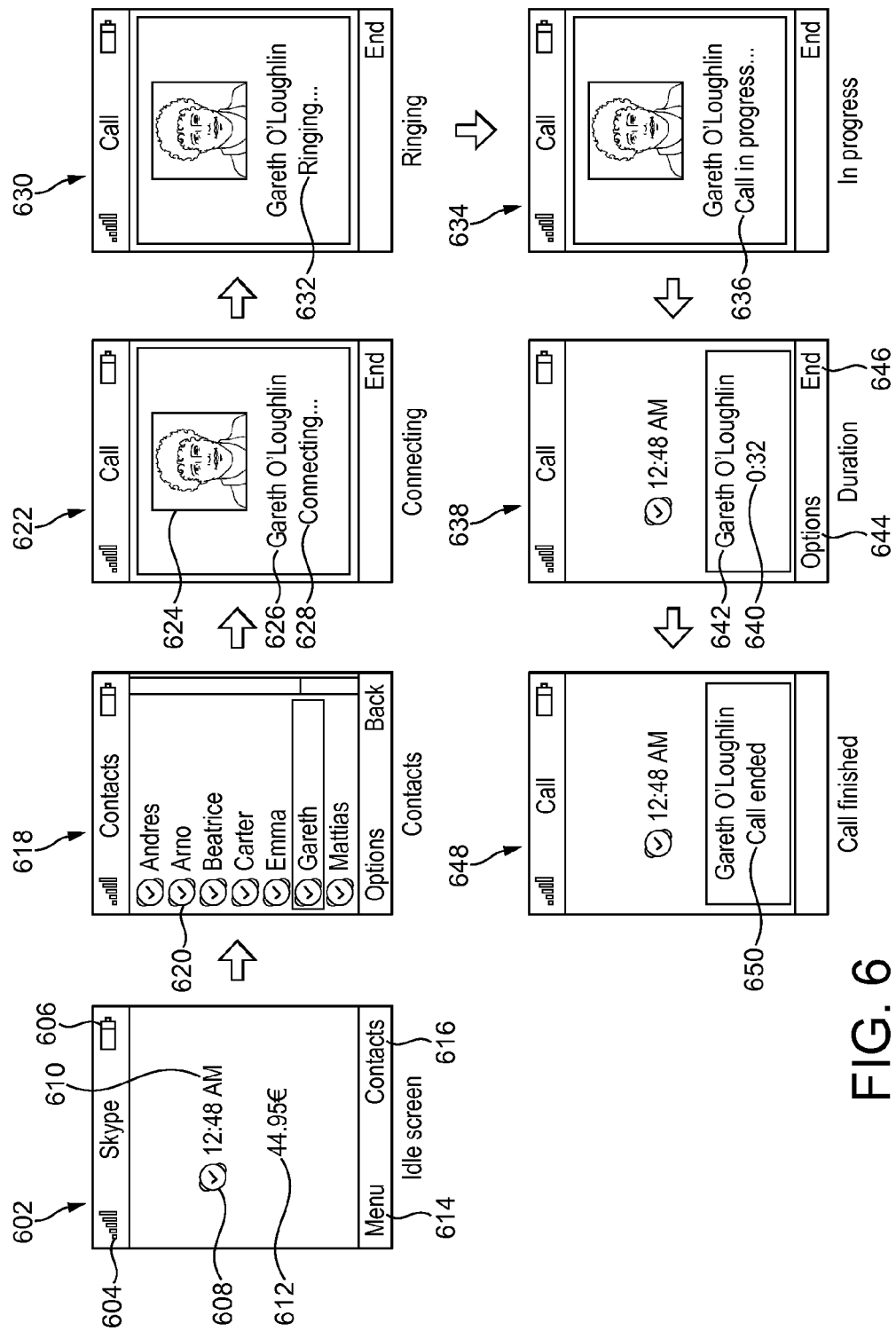
FIG. 6 shows a user interface when making an outgoing call to another user of the P2P communication service.

Referring first to FIG. 6, this figure shows a user making an outgoing call to another user of the P2P communication service, for example between the wireless VoIP handset 302 and computer terminal 112 in FIG. 3A. The UI screen shown in 602 illustrates the main idle screen of the wireless VoIP handset. This screen shows the wireless network signal strength 604, the level of battery charge 606, the user's current presence status (indicated by icon 608), the current time 610, and the amount of credit on the user's account 612. At the bottom of the display are shown the labels for the soft keys LSK 510 and RSK 512. The label 614 shows that if the LSK 510 is selected, the user is presented with a "Menu" screen. The label 616 shows that if the RSK 512 is selected, the user is presented with a "Contacts" screen.

The UI screen shown in 618 illustrates the contacts UI display that the user is shown when the RSK 512 is selected in screen 602. Screen 618 shows a list of contacts that the user has stored on the device (these may also have been retrieved from the contact server as described previously). Each of the contacts has a name, and in this example they are all other users of the P2P communication service, as indicated by the icon 620 next to the name. The icon 620 indicates the presence status of the contact to the user. For example, the icon may indicate that the contact is online, offline, away, busy ("do not disturb") or any other suitable status. The LSK 510 takes the user to an "Options" screen (described hereinafter) and the RSK 512 takes the user back to the main idle screen.

The user can use the navigation pad 514 to scroll though the list of names. When the user selects one of the names the wireless VoIP handset initiates a P2P communication service call to the selected user.

The screen 622 shows the UI display when the call to the selected contact is initiated. The screen 622 shows the picture 624 of the person being called, their name 626, and the message "Connecting . . . " 628. The user can end the call at this stage by selecting the RSK 512, or by using the end key 516. The screen 630 shows the UI display when the call has been connected, and is ringing at the terminal of the contact. This displays the same information as screen 622, except the message now shows "Ringing . . . " 632.

When the called person picks up and the call is connected, the screen shown in 634 is displayed. This screen shows the same information as screen 630, except that the message now reads "Call in progress" 636. The screen 634 is only displayed temporarily, typically for a few seconds, and then the screen 638 is displayed. Screen 638 displays the duration 640 of the ongoing call and the name of the called person 642. The label for the LSK 510 is "Options" 644, and by pressing the LSK 510, the user is presented with options for handling the ongoing call, such as putting the call on hold or muting the microphone.

The call is ended by pressing the end key 516 or my pressing the RSK 512, labelled "End" 646. When the call is ended the screen 648 is displayed for a few seconds. This shows the same information as screen 638, except that the duration is replaced by the message "Call ended" 650. The UI then reverts to the main idle screen 602.

Figure 7:
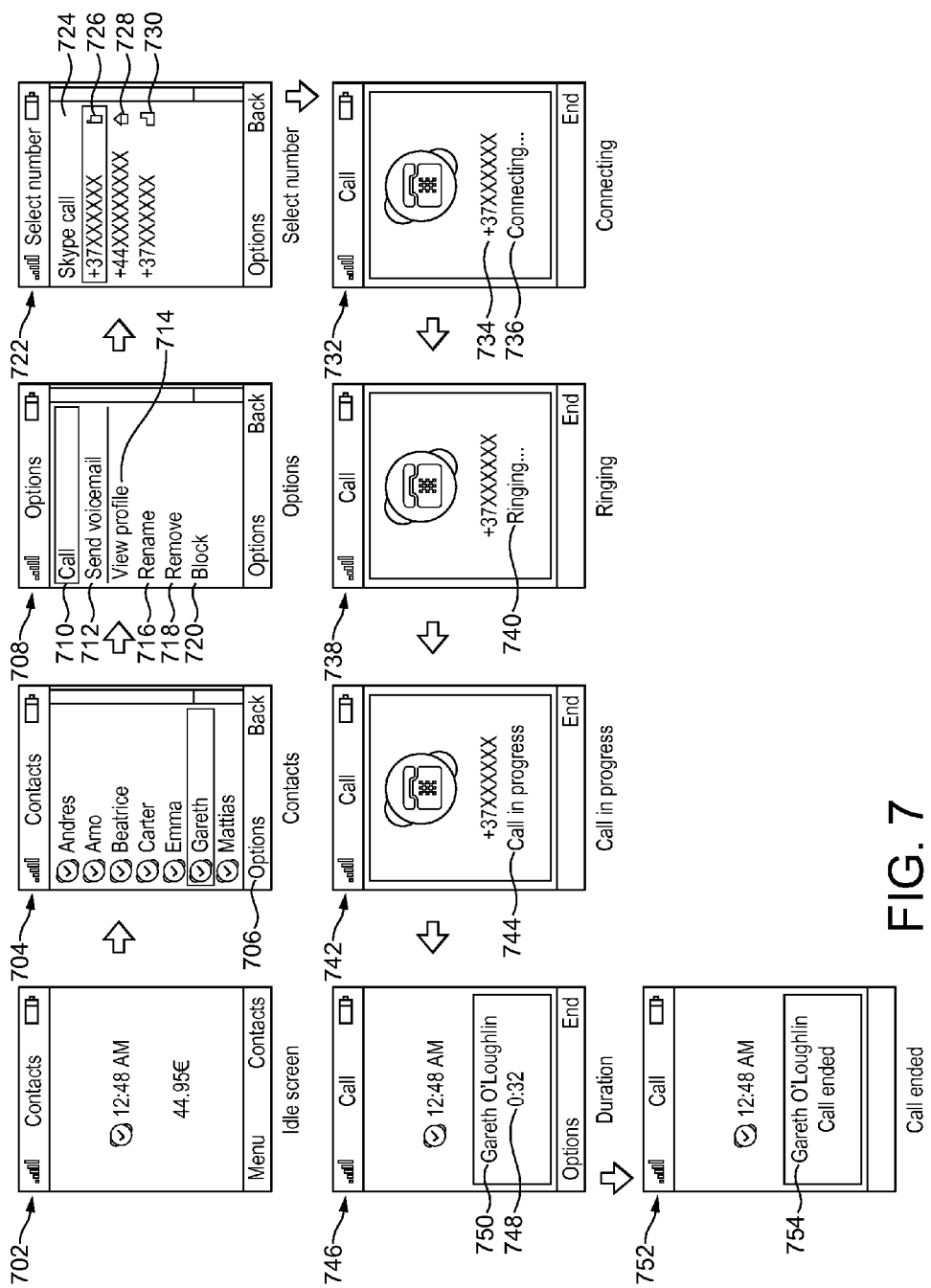
FIG. 7 shows a user interface when making an outgoing call to a public switched telephone network (PSTN) number.

Reference is now made to FIG. 7, in which is shown the UI displays for a user making an outgoing call to a PSTN number, for example between the wireless VoIP handset 302 and fixed-line telephone 124 in FIG. 3A. The first two screens 702 and 704 are identical to those shown in 602 and 618 in FIG. 6 (and described above). However, in screen 704, when the desired contact is selected the LSK 510 with the label "Options" is pressed (rather than depressing the centre of the navigation pad 514 as was done with FIG. 6). The user is then displayed screen 708, which shows several options for the selected contact. The user can select to call the contact (710), send a voicemail to the contact (712), view the profile of the contact (714), rename the contact (716), remove the contact from the contact list (718), and block the contact from calling the user (720).

In this example, the user selects the option to call the contact (710), and is presented with screen 722. Screen 722 lists the different methods of communicating with the contact that the user has stored on the device. The screen 722 shows that the contact can be called using the P2P communication service ("Skype call" 724), using a mobile telephone number 726, using a home PSTN number 728 and using an office PSTN number 730. The icons next to the numbers indicate their category (mobile, home, office etc.). Some contacts can, of course, have greater or fewer entries for different ways of contacting the person. In the example shown in FIG. 7, the user selects to call the mobile number 726 of the contact, by depressing the centre of the navigation pad 514 or pressing the LSK 510.

When the call to the selected number is being connected, the user is displayed screen 732, which shows the number being called 734 and the message "Connecting . . . " 736. When the telephone of the called person is ringing, the user is shown screen 738, which is identical to the previous screen, except that the message now states "Ringing . . . " 740. When the call is answered, screen 742 is displayed. This screen is identical to the previous screen, except that the message reads "Call in progress" 744.

Screen 742 is only displayed for a few seconds, and the user is then displayed screen 746. This screen shows the duration of the call 748 and the name of the contact 750, and is displayed until the call is ended. When the call is ended screen 752 is displayed for a few seconds. This shows the same information as screen 746, except that the duration is replaced by the message "Call ended" 754. The UI then reverts to the main idle screen 702.

Figure 8:
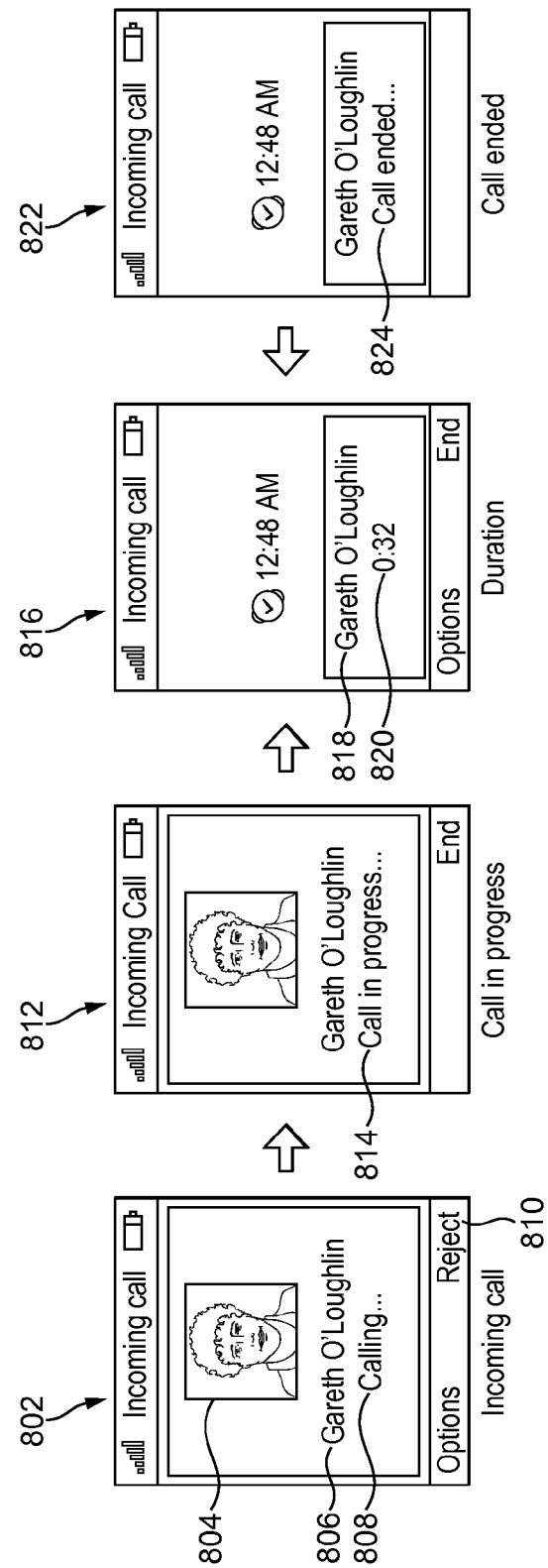
FIG. 8 shows a user interface when receiving an incoming call from another user of the P2P communication service.

Reference is now made to FIG. 8, which illustrates a user receiving an incoming call from another user of the P2P communication service, for example from computer terminal 112 to the wireless VoIP handset 302 in FIG. 3A. When the incoming call is received at the wireless VoIP handset 302, the screen 802 is displayed (and the device rings/vibrates, as mentioned previously). Screen 802 displays the picture of the contact 804, the name of the contact 806 and the message "Calling" 808. The user can reject the incoming call using the end key 516 or the RSK 512, for which the label "Reject" 810 is displayed.

If the user accepts the call using the send key 514, the screen 812 is displayed. This screen is similar to the previous screen except that the message now reads "Call in progress" 814. Screen 812 is only displayed for a few seconds, before screen 816 is displayed. Screen 816 shows the name 818 of the caller and the duration of the incoming call 820. When the call ends, the user is shown screen 822 for a few seconds. This screen is similar to the previous screen, except that the duration is replaced by the message "Call ended" 824.

Figure 9:
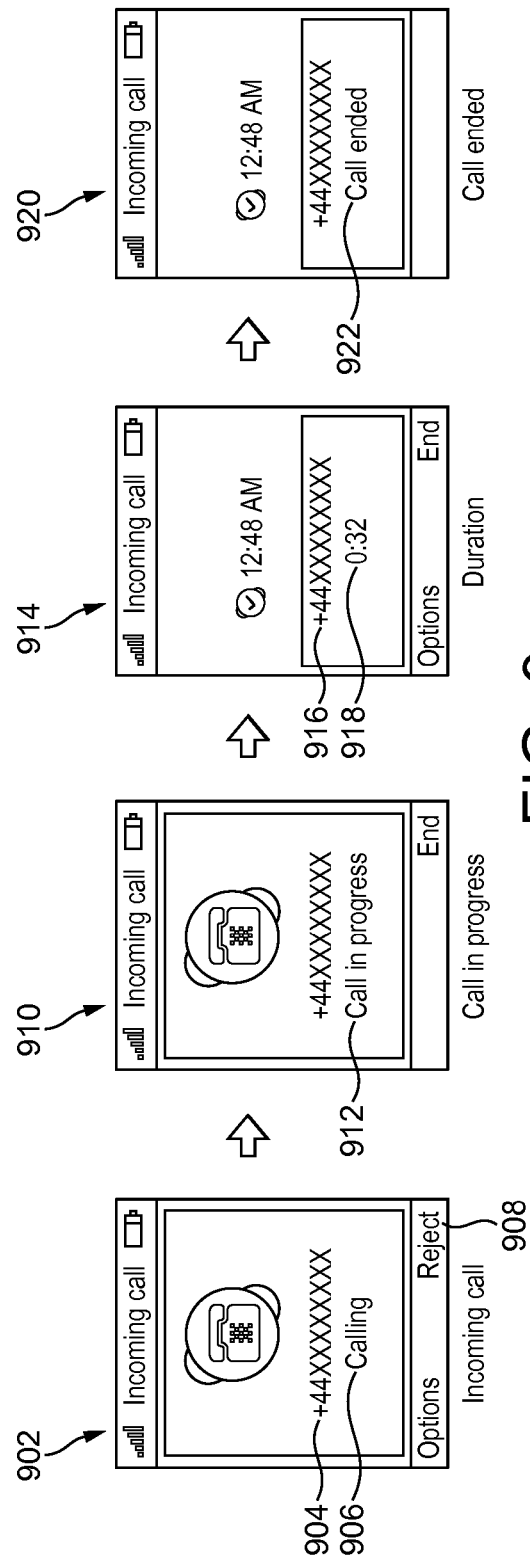
FIG. 9 shows a user interface when receiving an incoming call from the PSTN.

Reference is now made to FIG. 9, which illustrates a user receiving an incoming call from the PSTN, for example from fixed-line telephone 124 to the wireless VoIP handset 302 in FIG. 3A. When the incoming call is received at the wireless VoIP handset 302, the screen 902 is displayed (and the device rings/vibrates, as mentioned previously). Screen 902 displays the telephone number 904 of the personal calling and the message "Calling" 906. The user can reject the incoming call using the end key 516 or the RSK 512, for which the label "Reject" 908 is displayed.

If the user accepts the call using the send key 514, the screen 910 is displayed. This screen is similar to the previous screen except that the message now reads "Call in progress" 912. Screen 910 is only displayed for a few seconds, before screen 914 is displayed, which shows the telephone number 916 of the caller and the duration of the incoming call 918. When the call ends, the user is shown screen 920 for a few seconds. This screen is similar to the previous screen, except that the duration is replaced by the message "Call ended" 922.

The above-described VoIP wireless handset therefore provides a solution to the problem of enabling VoIP calls over a P2P communication service, without the requirement to have a PC present and powered on. The VoIP wireless handset also gives the user mobility, not only within the coverage area of the WLAN access point, but the user can also take the device with them when they travel, and use it to make VoIP calls wherever there is WLAN coverage.

In addition, the VoIP wireless handset provides further advantages over traditional PSTN and mobile telephones. For example, the user of the VoIP wireless handset can search for other users of the P2P communication service using the VoIP wireless handset, effectively giving them access to a full directory direct from the handset. The user can also log into and use a VoIP wireless handset of a different user and gain access to their personal contact list downloaded from a contact server in the network.

While this invention has been particularly shown and described with reference to preferred embodiments, it will be understood to those skilled in the art that various changes in form and detail may be made without departing from the scope of the invention as defined by the appendant claims.

The invention claimed is:

1. A wireless handset for making a voice call in a communications system from a user of the handset to a contact in the form of another user, the handset comprising:
   a display;
   a keyboard comprising multifunctional keys capable of entering numeric or alphabetic characters depending on a number of key presses, said keyboard being arranged to enter contact information of users into a user interface displayed on said display, select contacts on the user interface, and initiate a packet data voice call with a contact selected by the user;
   a microprocessor arranged to execute embedded client software, wherein the client software is arranged to establish a packet data voice call over a network and encode speech information for the voice call as individually addressed packets for routing to the selected contact; and
   a radio communication device arranged to transmit said individually addressed packets as radio signals from said wireless handset to the network.

2. A wireless handset as claimed in claim 1, wherein the individually addressed packets comprise voice over internet protocol (VoIP) packets.

3. A wireless handset as claimed in claim 1, further comprising a storage device for storing contact information, whereby, upon activation of the wireless handset, the contact information is transmitted to the wireless handset from a contact server connected to said network and stored in said storage device.

4. A wireless handset as claimed in claim 1, wherein the user interface further displays presence information for the contacts, said presence information indicating the current status of the contact.

5. A wireless handset as claimed in claim 1, wherein the user interface further displays a contact search interface, whereby information is entered into the contact search interface using the keyboard and, in response thereto, the microprocessor is arranged to create a contact search request that is transmitted to the network by said radio communication device.

6. A wireless handset as claimed in claim 5, wherein, in response to the contact search request, a contact search response is received by said radio communication device, said contact search response being displayed on said user interface.

7. A wireless handset as claimed in claim 6, wherein a packet data voice call may be established with a contact displayed in said contact search response.

8. A wireless handset as claimed in claim 6, wherein a contact displayed in said contact search response may be stored in the wireless handset.

9. A handset for making a voice call in a use in a communications system from a user of the handset to a contact in the form of another user, the handset comprising:
   a display;
   a keyboard comprising multifunctional keys capable of entering numeric or alphabetic characters depending on a number of key presses, said keyboard being arranged to enter contact information of users into a user interface displayed on said display, select contacts on the user interface, and initiate a packet data voice call with a contact selected by the user;
   a microprocessor arranged to execute embedded client software, wherein the client software is arranged to establish a packet data voice call over the network and encode speech information for the voice call as individually addressed packets for routing to the selected contact; and
   a communication interface arranged to transmit said individually addressed packets from said handset to a network.

10. A handset as claimed in claim 9, wherein the communication interface is a wired interface.

11. A handset as claimed in claim 9, wherein the communication interface is an Ethernet interface.

12. A wireless handset for making a voice call in a communications system from a user of the handset to a contact in the form of another user, the handset comprising:
   a display;
   a keyboard comprising multifunctional keys capable of entering numeric or alphabetic characters depending on a number of key presses, said keyboard being arranged to enter contact information of users into a user interface displayed on said display, select contacts on the user interface, and initiate a packet data voice call with a contact selected by the user;
   a microprocessor arranged to execute embedded client software, wherein the client software is arranged to establish a packet data voice call over a network and encode speech information for the voice call as individually addressed packets for routing to the selected contact;
   a radio communication device arranged to transmit said individually addressed packets as radio signals from said wireless handset to the network; and
   where a network element is connected to the network and is arranged to transfer the individually addressed packets to the network.

13. A wireless handset as in claim 12 wherein the individually addressed packets comprise voice over internet protocol (VoIP) packets.

14. A wireless handset as in claim 12 wherein a contact server is connected to the network for storing the contact information, where, upon activation, the contact information is transmitted to the wireless handset via the network element and stored in said wireless handset.

15. A wireless handset as in claim 12 wherein said packet data voice call is established with a user terminal connected to said network.

16. A wireless handset as in claim 12 further comprising a gateway element connected between said data network and a public switched telephone network, wherein said packet data voice call is established with a user terminal connected to said public switched telephone network.

17. A method for making calls using a wireless handset for use in a communications system from a user of the handset to a contact in the form of another user, the method comprising:

processing input from a keyboard having multifunctional keys capable of entering numeric or alphabetic characters depending on a number of key presses, said keyboard enabling input of contact information of users into a user interface displayed on a display, select contacts on the user interface, and initiate a packet data voice call with a contact selected by the user;

processing embedded client software to establish a packet data voice call over a network and encode speech information for the voice call as individually addressed packets for routing to the selected contact; and transmitting individually addressed packets as radio signals from said wireless handset to the network.

* * * * *

UNITED STATES PATENT AND TRADEMARK OFFICE
CERTIFICATE OF CORRECTION

PATENT NO. : 7,912,448 B2
APPLICATION NO. : 11/515411
DATED : March 22, 2011
INVENTOR(S) : Taavet Hinrikus et al.

It is certified that error appears in the above-identified patent and that said Letters Patent is hereby corrected as shown below:

In Column 14, Claim 9, Line 18, please delete "in a use".

Signed and Sealed this
Eighth Day of November, 2011

David J. Kappos
*Director of the United States Patent and Trademark Office*